Patented Aug. 25, 1925.

1,551,095

UNITED STATES PATENT OFFICE.

HERMANN FRITZSCHE AND PAUL SCHAEDELI, OF BASEL, SWITZERLAND, ASSIGNORS TO SOCIETY OF CHEMICAL INDUSTRY IN BASLE, OF BASEL, SWITZERLAND.

CYANURIC INTERMEDIATE PRODUCTS AND PROCESS OF MAKING SAME.

No Drawing.   Application filed July 23, 1924.   Serial No. 727,830.

*To all whom it may concern:*

Be it known that we, HERMANN FRITZSCHE and PAUL SCHAEDELI, both citizens of the Swiss Confederation, and residing at Basel, Switzerland, have invented new and useful Cyanuric Intermediate Products and Processes of Making Same, of which the following is a full, clear, and exact specification.

The present invention relates to new intermediate products. It comprises the new products as well as the process of making same.

It has been found that cyanuric halides may be condensed with α-naphthol to form new nucleal condensation products which are valuable parent materials for the manufacture of dyestuffs.

These new products are obtained by the action of cyanuric halides which contain in the cyanuric ring at least one halogen atom which can be exchanged and have the following general formula

(in which A and B also represent halogen atoms or any inorganic or organic residues, capable of taking the place of halogen) on α-naphthol, preferably in presence of condensing agents, such as aluminum chloride or sulfuric acid, in presence or absence of indifferent diluents, such as carbon bisulfide, petroleum ether, tetrachlorethane, nitrobenzene, and the like. The cyanuric halide may react with as many molecules of α-naphthol as there are halogen atoms in the cyanuric nucleus capable of being exchanged, such halogen being liberated in the form of hydrochloric acid. The products thus obtained, in case they still contain exchangeable halogen atoms in the cyanuric nucleus, may be further condensed with compounds containing mobile hydrogen atoms, such as amino- and hydroxy-compounds.

The new products, prepared according to the herein described process, are most probably para-hydroxynaphthyl-1:3:5-triazines having the following general formula

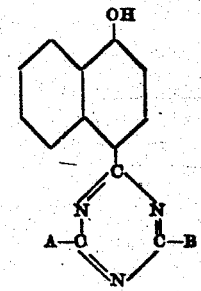

(in which A and B represent halogens, inorganic or organic residues capable of taking the place of halogens, such as aryl, OR, NHR, (R meaning H, alkyl, aryl).

The new products form pale yellow to yellow and brown powders, dissolving in sulfuric acid to yellow, violet-blue and brown solutions, in caustic soda lye to yellow solutions. With acids they yield more or less stable salts having a characteristic color.

The following examples illustrate the invention.

*Example 1.*

Into a melt of 58 parts of α-naphthol at about 80° C. is gradually stirred a mixture of 18.5 parts of cyanuric chloride and 20 parts of aluminum chloride. The reaction sets in immediately, the temperature rising and hydrogen chloride being evolved. After the mass has been maintained at a temperature of 115° C. for a short time, it is almost solid. When ground after cooling, the product is a brick-red powder. After boiling with much water containing hydrochloric acid orange-red flocks are obtained, which appear to be the double compound of the condensation product from one molecule of cyanuric chloride and three molecules of α-naphthol with one molecule of hydrochloric acid. For further purification they are dissolved in 1000 parts of water and 40 parts of concentrated caustic soda solution, the solution is filtered and the intensely yellow filtrate is treated with excess of hydrochloric acid to re-precipitate the compound. The compound free from hydrochloric acid, namely 2:4:6-tripara-hydroxynaphthyl-1:3:5-triazine, is obtained by decomposing an alkaline solution of the compound by means of a feeble acid, such as acetic acid or sodium bisulfite.

The 2:4:6-tripara-hydroxynaphthyl-1:3:5-triazine of the following formula

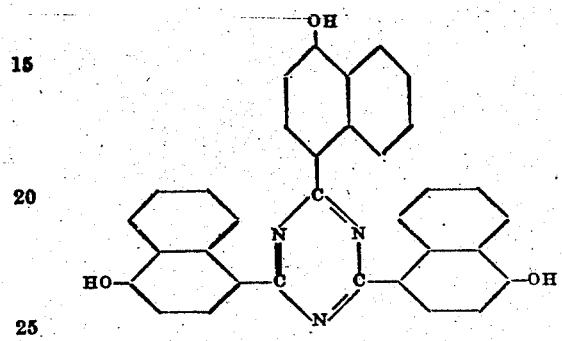

is of light yellow color. It dissolves in acetone and alcohol easily and in benzene with difficulty. In caustic alkali it is dissolved to an intensely yellow solution. Concentrated sulfuric acid dissolves it to a blue-violet solution from which on dilution with water it is precipitated in the form of orange-red flocks. When redissolved in acetone, xylene being added and the acetone evaporated, it melts above 300° C. By treating the acetone solution with gaseous hydrochloric acid the orange-red double compound is precipitated in the form of fine crystals.

*Example 2.*

58 parts of α-naphthol are heated to 110° C. and the melt thus obtained is mixed, in one portion, with 18.5 parts of cyanuric chloride. After a short time reaction occurs with a lively elimination of hydrochloric acid, the temperature spontaneously rising to 140° C. Thereafter the mixture is heated for some time longer at 160° C. until no more hydrochloric acid is developed, and the product is isolated as described in Example 1.

By adding a small quantity of sulfuric acid the beginning of the reaction may be somewhat accelerated, it being of advantage, in order to complete the reaction, to raise the temperature at the end of the operation to 200° C.

*Example 3.*

58 parts of α-naphthol, 20 parts of aluminum chloride and 18.5 parts of cyanuric chloride are added in succession to 200 parts of tetrachlorethane, while stirring. The mass gradually becomes heated to 60° C. and evolves hydrogen chloride. After it has been warmed for some hours on the boiling water bath it is cooled, whereupon the condensation product, which has separated as a tough mass, solidifies. It may be purified as described in Example 1 and is identical with the product of that example.

*Example 4.*

24.2 parts of the condensation product from one molecular proportion of cyanuric chloride and one molecular proportion of aniline are mixed with 15 parts of aluminum chloride and the mixture is stirred into a melt of 45 parts of α-naphthol at 85° C. and the whole is heated for a short time to 120° C. The cooled mass is powdered, extracted by boiling water and dissolved in dilute caustic soda solution from which solution it is precipitated by hydrochloric acid. In this manner orange flocks are obtained which by dissolution in dilute caustic soda solution and treatment with a feeble acid are converted into the 2-phenylamino-4:6-di-para-hydroxynaphthyl-1:3:5-triazine in the form of feebly yellowish flocks.

This triazine is a yellow powder when dried; it dissolves in concentrated sulfuric acid to a bluish-red solution, from which on dilution with water the product is precipitated again in the form of orange flocks. In caustic alkali it is dissolved to an intensely yellow solution. When crystallized out of acetone-xylene it melts at 255–258° C.

*Example 5.*

128 parts of the condensation product from one molecular proportion of cyanuric chloride and one molecular proportion of o-toluidine are introduced with 150 parts of α-naphthol into 1600 parts of tetrachlorethane, while stirring vigorously, and treated with 125 parts of aluminum chloride. Thereupon stirring is continued for some time at 140° C. after which the mass is allowed to cool and the viscous product of the reaction is separated from the diluent by decanting. The product of reaction is then boiled with dilute hydrochloric acid, whereby it forms an orange-red powder which is filtered, dissolved in dilute caustic soda solution and precipitated by acidification with acetic acid. The 2-ortho-tolylamino-4:6-di-para-hydroxynaphthyl-1:3:5-triazine thus obtained is a bright yellow powder which dissolves in caustic soda solution to a yellow solution and in concentrated sulfuric acid to a bluish-red solution. In order to purify it completely, the product is dissolved in ether and precipitated by means of gaseous hydrochloric acid. If re-crystallized from a mixture of acetone and xylene the new triazine softens at 190° C. and melts at about 195° C.

The 2,(2-chloro)-phenylamino-4:6-di-para-hydroxynaphthyl-1:3:5-triazine obtained in an analogous manner from the condensation product from one molecular proportion of cyanuric chloride, one molecular proportion of orthochloraniline (melting point 158° C.) and two molecular proportions of α-naphthol melts at about 222–225° C.; the corresponding (2:5-dichloro)-compound obtainable from the condensation product from one molecular proportion of cyanuric chloride and one molecular proportion of 2:5-dichloraniline (melting point 170° C.) melts at about 155–160° C.; the (4-chloro)-compound at about 190–193° C.; and the (3-nitro)-compound at about 291–292° C.

Example 6.

Into a melt of 28 parts of α-naphthol at 90° C. is introduced, while stirring, a mixture of 14.1 parts of chlorocyanuric diamide and 10 parts of aluminum chloride. The melt is heated to 120° C. for a short time, cooled, powdered and boiled with water containing hydrochloric acid, whereby it is changed into yellow flocks. These are filtered cold and separated from excess of α-naphthol by washing with acetone. There remains the yellow powder which is the hydrochloride of 2:4-diamino-6-para-hydroxynaphthyl-1:3:5-triazine; it crystallizes from water containing hydrochloric acid in the form of slender yellow needles and when treated with sodium carbonate becomes the compound free from hydrochloric acid.

This triazine is almost colorless and melts at 305–308° C. It dissolves in alkalies to a feebly yellow solution and in concentrated sulphuric acid to an orange solution.

Example 7.

Into 28 parts of fused α-naphthol there are introduced 29.8 parts of the condensation product of melting point 196–197° C. obtainable from one molecular proportion of cyanuric chloride and two molecular proportions of aniline, and 10 parts of aluminum chloride. After heating for a short time to 115° C. the mass is powdered, extracted with boiling water and then heated with about 15 per cent of its weight of strong caustic soda solution. There separates the sodium salt in the form of a smeary mass which dissolves when diluted with hot water. From this solution common salt precipitates the sodium salt of the new condensation product. If it is dissolved in water and acetic acid is cautiously added, the 2:4-diphenylamino-6-para-hydroxynaphthyl-1:3:5-triazine is obtained, which by dissolution in ether, addition of xylene to the solution and evaporation of ether, or by crystallizing from nitrobenzene, may be further purified. It melts at 241–242° C., dissolves in concentrated sulfuric acid to an orange solution, from which it is precipitated in a yellow form by adding a little water, and in a colorless form by adding much water.

Example 8.

Into 1600 parts of tetrachlorethane there are introduced 111 parts of the secondary condensation product from one molecular proportion of cyanuric chloride, one molecular proportion of aniline, and one molecular proportion of ammonia (white powder melting at 205–206° C.), together with 170 parts of α-naphthol and 110 parts of aluminum chloride, the whole being stirred for some time at 140° C. The product of the reaction is isolated as described in Example 7. The 2-phenylamino-4-amino-6-para-hydroxynaphthyl-1:3:5-triazine forms a feebly yellowish powder which dissolves in concentrated sulfuric acid to an orange solution and in caustic soda solution to a bright yellow solution, melting, when re-crystallized from a mixture of acetone and xylene, at 238–240° C.

Example 9.

Into 1600 parts of tetrachlorethane there are introduced, while cooling with ice, 51.2 parts of the condensation product from one molecular proportion of cyanuric chloride and one molecular proportion of o-toluidine, together with 29 parts of α-naphthol and 51 parts of aluminum chloride. The mixture is stirred for some time, whereby the temperature gradually rises to 15° C.; the diluent is then distilled away with steam and the residue dried, dissolved in acetone and precipitated by introducing gaseous hydrochloric acid. The hydrochloric acid compound of the 2-chloro-4-ortho-tolylamino-6-para-hydroxynaphthyl-1:3:5-triazine forms a yellowish-orange powder.

Example 10.

Into 1000 parts of carbon bisulfide, cooled to —5° C., there are introduced 93 parts of cyanuric chloride and then gradually 144 parts of α-naphthol. The whole is stirred for some time, the temperature of the mixture being allowed to attain by degrees the temperature of the room (about 15° C.). The mass is then filtered and the residue dried. It is dissolved in a mixture of 1000 parts of acetone and 200 parts of water, whereby two layers are formed. The aqueous layer, containing all the aluminum chloride, is drawn off, and the acetone layer, containing the 2-chloro-4:6-di-para-hydroxynaphthyl-1:3:5-triazine that has been formed, is distilled away with steam. The residue is dried and dissolved in acetone.

The 2-chloro-4:6-di-para-hydroxynaphthyl-1:3:5-triazine in the form of a hydrochloric acid compound is a red powder which dissolves in concentrated sulfuric acid to a bluish-red solution that shifts rapidly to brown; in caustic soda solution it dissolves to a yellow solution.

Treated with aluminum chloride and α-naphthol it yields the 2:4:6-tri-para-hydroxynaphthyl-1:3:5-triazine described in Example 1; heated with an excess of orthochloraniline it yields the 2(2-chloro)-phenylamino-4:6-di-para-hydroxynaphthyl-1:3:5-triazine mentioned at the end of Example 5.

*Example 11.*

20.1 parts of the condensation product melting at 77–78° C. from one molecular proportion of cyanuric chloride, one molecular proportion of diethylamine, and one molecular proportion of ammonia are dissolved together with 17 parts of α-naphthol in 500 parts of tetrachlorethane. After addition of 20 parts of aluminum chloride the mixture is heated for some hours, while stirring, to 140° C. The solvent is then blown off with steam, the residue boiled with dilute hydrochloric acid, filtered and treated with caustic soda solution. The sodium salt of the 2-diethylamino-4-amino-6-para-hydroxynapthyl-1:3:5-triazine is precipitated with common salt. By dissolving the sodium salt in water and precipitation with acetic acid there is obtained the free naphthol in form of bright yellow flocks which dissolve in sulfuric acid to a brown-yellow solution.

What we claim is:

1. The process for the manufacture of new intermediate products, consisting in reacting cyanuric compounds of the general formula:

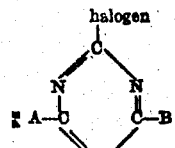

(wherein A and B represent halogens or residues capable of taking the place of halogens) with α-naphthol.

2. The process for the manufacture of new intermediate products, consisting in reacting cyanuric compounds of the general formula:

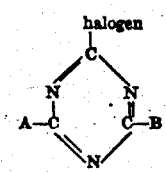

(wherein A and B represent halogens or residues capable of taking the place of halogens) with α-naphthol in presence of a condensing agent.

3. The process for the manufacture of new intermediate products, consisting in reacting cyanuric compounds of the general formula:

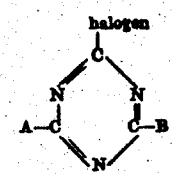

(wherein A and B represent halogens or residues capable of taking the place of halogens) with α-naphthol in presence of a condensing agent, and in condensing the products thus obtained further with compounds having mobile hydrogen atoms in amino- and hydroxy-groups.

4. The process for the manufacture of new intermediate products, consisting in reacting cyanuric compounds of the general formula:

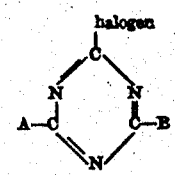

(wherein A and B represent halogens or residues capable of taking the place of halogens) with α-naphthol in presence of a condensing agent, and in condensing the products thus obtained further with compounds having mobile hydrogen atoms in amino- groups.

5. As new products the new compounds of the general formula:

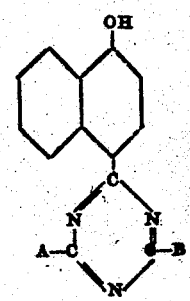

(wherein A and B represent halogens, inorganic or organic residues capable of taking the place of halogens) which products form pale yellow to yellow and brown powders, dissolving in sulfuric acid to yellow, bluish-red, violet-blue and brown solutions, in caustic soda solution to yellow to intensely yellow solutions, yielding with acids more or less stable salts having a characteristic color.

6. As new products the new compounds of the general formula:

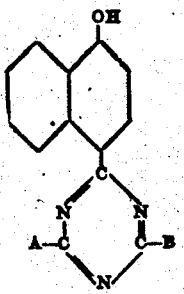

(wherein A and B represent inorganic or organic residues capable of taking the place of halogens) which products form pale yellow to yellow and brown powders, dissolving in sulfuric acid to yellow, bluish-red, violet-blue and brown solutions, in caustic soda solution to yellow to intensely yellow solutions, yielding with acids more or less stable salts having a characteristic color.

7. As new products the new compounds of the general formula:

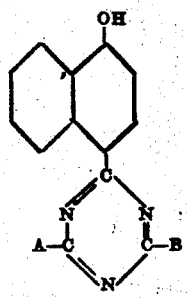

(wherein A and B represent aromatic residues) which products form pale yellow to yellow and brown powders, dissolving in sulfuric acid to yellow, bluish-red, violet-blue and brown solutions, in caustic soda solution to yellow to intensely yellow solutions, yielding with acids more or less stable salts having a characteristic color.

In witness whereof we have hereunto signed our names this 12th day of July, 1924.

HERMANN FRITZSCHE.
PAUL SCHAEDELI.